O. R. SCHULTZ AND O. KIRSCH.
METHOD OF AND APPARATUS FOR MAKING MULTICOLOR PRINTS.
APPLICATION FILED DEC. 22, 1921.
Reissued Feb. 14, 1922. 15,286.
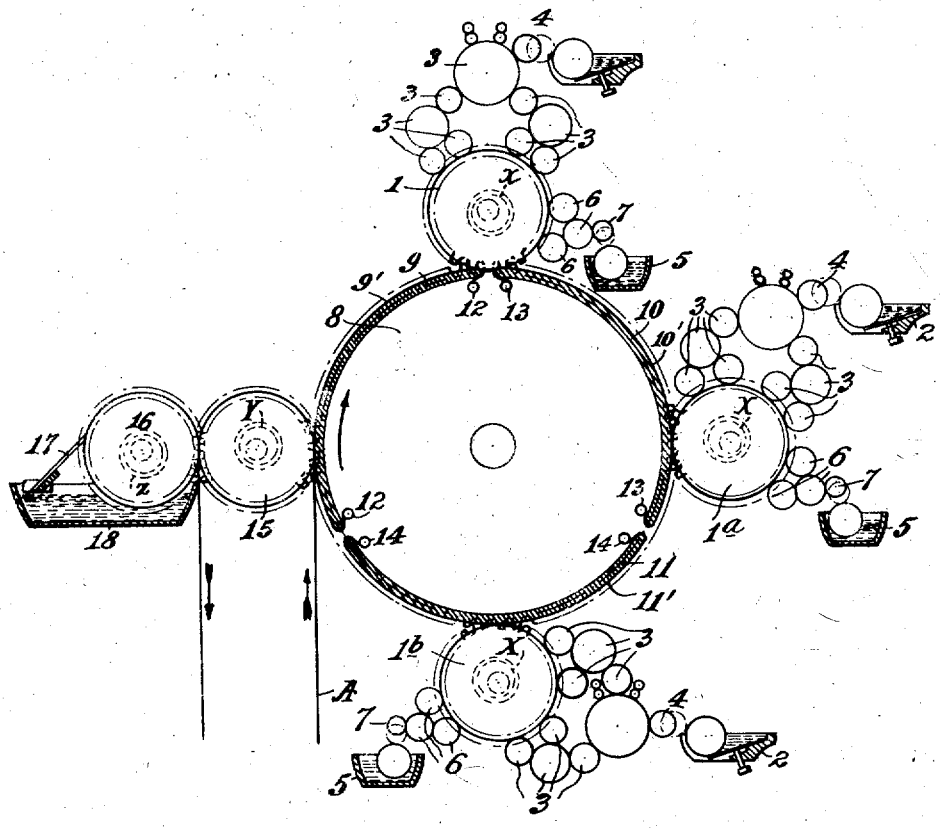
Oswald R. Schultz,
Otto Kirsch,
INVENTORS,
BY Their Attorney,
W. H. Lawrence

UNITED STATES PATENT OFFICE.

OSWALD R. SCHULTZ AND OTTO KIRSCH, OF NEW YORK, N. Y.

METHOD OF AND APPARATUS FOR MAKING MULTICOLOR PRINTS.

15,286. Specification of Reissued Letters Patent. Reissued Feb. 14, 1922.

Original No. 1,379,365, dated May 24, 1921, Serial No. 423,889, filed November 13, 1920. Application for reissue filed December 22, 1921. Serial No. 524,288.

*To all whom it may concern:*

Be it known that we, OSWALD R. SCHULTZ and OTTO KIRSCH, citizens of the United States, and residents, respectively, of the city of New York, county of Bronx, and State of New York, and city of New York, county of Kings, and State of New York, have invented new and useful Improvements in Methods of and Apparatus for Making Multicolor Prints, of which the following is a specification.

This invention relates to the production of color prints and has for its particular objects the rapid and economical production of prints which are faithful reproductions of an original copy, both as to design and color, the same being especially suitable for high speed printing such as is employed in newspaper and magazine publishing plants.

In the production of color prints as at present practised it is customary, except when using half-tone processes, to employ a great number of colors, for example often from six to twelve colors are employed and usually but two colors at most, and in high-class work but a single color, are printed in a separate operation.

Our investigations have resulted in the discovery that the present complex lithographic offset methods of producing color prints can be very materially simplified and at the same time improved upon by means of the invention hereinafter fully set forth and described in detail.

In the accompanying drawing forming a part of this specification, we have illustrated a diagrammatic vertical section, partially in elevation, of a novel apparatus designed for carrying out our improved method of producing color prints.

Referring to the drawings and the construction shown therein reference numerals 1, $1^a$, $1^b$ designate cylinders or rolls equipped with offset lithographic plates, the same being supplied with ink from their respective reservoirs 2 through a series of contacting distributing rolls 3, and movable carrier rolls 4 as well as with water from reservoirs 5 through a series of contacting distributing rolls 6 and movable carrier rolls 7 in the manner customary in this art. The aforesaid cylinders are adapted to optionally mesh with a main impression cylinder 8, each of the cylinders 1, $1^a$, and $1^b$ being independently movable to and fro with respect to said cylinder 8 by the eccentrics so that they may be optionally thrown into or out of impression contact therewith. Preferably, as shown, the cylinder 8 is built in sections, the number of sections corresponding to the number of offset printing cylinders or rolls. In the illustration shown the said cylinder 8 is made in three sections 9, 10, and 11, respectively, and each section is equipped with an individual blanket 9′, 10′ and 11′, respectively, of yielding material, for example a woven cotton and rubber cloth. Said blankets are wound in the customary manner on take-up rolls 12, 13 and 14, respectively.

A fourth cylinder 15, which we term an intaglio impression cylinder, is also adapted to be thrown optionally into or out of impression contact with said impression cylinder 8 by the eccentric Y and the said cylinder 15 is also adapted to be optionally thrown into or out of impression contact with an intaglio cylinder 16. A doctor or scraper 17 serves to remove ink, supplied from a reservoir 18, from the surface portion of the said intaglio cylinder contacting therewith.

As an example of the manner of providing a color print in accordance with our invention, we proceed as follows:

Each of the cylinders 1, $1^a$ and $1^b$ is provided with plates such as customarily used in offset lithographic printing and represent only the portion of the original copy which is intended to be printed in the particular color with which the particular cylinder printing the same is supplied. For example, cylinder 1 will have plates thereon which represent the portion of the print that will correspond to the portion of the original copy that is yellow or a hue or shade that includes yellow in its combination of colors and cylinder $1^a$ and $1^b$ representing respectively the red portion and the blue portion of the original copy in the same manner. As it is evident from the construction shown, when there are three offset printing cylinders cooperating with the main impression cylinder, the external diameter of each of said offset printing cylinders will be such that the periphery of each of said cylinders will be just one-third of the periphery of the main impression cylinder and as shown, cylinder 1 and $1^b$ will be diametrically opposed to each other and cylinder $1^a$ will be diametrically opposed to the intaglio impression cylinder 15. The cylinder 1 will be supplied with yellow litho-offset ink and the cylinders $1^a$ and $1^b$ with red and blue litho-offset ink from their respective reservoirs, whereas the intaglio cylinder 16 will be supplied with the usual black intaglio ink used in printing of black shades.

At the commencement of the operation, cylinder 1 only is thrown into impression contact with the main impression cylinder 8 this being accomplished at the moment when the periphery of 1 comes immediately above the edge of a section such as 9, such a position as for example is illustrated in the drawing. The portion of the original copy which is represented by cylinder 1 will thereupon be impressed upon the blanket 9′ as the impression cylinder is rotated in a clock-wise direction as indicated by the arrow. As each successive section passes beneath the cylinder 1 it also will receive the same impression. The cylinder $1^a$ is thrown into impression contact with cylinder 8 at the moment the section 9 reaches the point immediately beneath the periphery of said cylinder $1^a$ while still retaining cylinder 1 in impression contact as aforesaid. Thereupon cylinder $1^a$ will impress upon the blanket 9′ the portion of the original copy which it represents and this color will be superimposed on the color received from cylinder 1 by said blanket. At the moment the section 9 reaches the point immediately beneath the cylinder $1^b$ the latter is thrown into compression contact with the main impression cylinder and thereby the portion of the original copy represented by the plates of cylinder $1^b$ will be superimposed upon the imprint received from cylinder $1^a$. Immediately upon section 9 arriving at a point immediately beneath cylinder 15 which carries the paper or other material which it is desired to print, the said cylinder 15 is thrown into impression contact with the impression cylinder 8 and as a consequence the tri-color impression received from the three offset printing cylinders will be printed upon the paper A. Similarly the intaglio cylinder 16 is thrown into impression contact with the cylinder 15 by the eccentric Z at the moment when the impression on said paper passes beneath the cylinder 16 with the consequence that a roto-gravure print will be superimposed upon the impression carried by the paper and thereby those portions of the original copy which correspond to the shades will be received from said intaglio cylinder.

In order to prevent waste of ink and the accumulation of the same upon the blanket of the main impression cylinder, we provide the said apparatus with well-known mechanism for stopping the machine in the event of a break in the paper or other material being printed. Of course in the event of such stoppage it is advisable to separate the offset printing cylinder from the main cylinder and immediately take off the ink from the blanket before it dries by taking an impression therefrom and then to start up operations in the manner above described.

If desired, the rotogravure from the cylinder 16 can be applied directly to the sheet of material to be printed in lieu of the aforesaid incomplete composite tri-color print taken off from the main impression cylinder, i. e. the direction of travel of the sheet and the respective rolls can be reversed to receive the intaglio imprint first and then the said incomplete composite tri-color print. In such an event, however, it would be necessary, if operating at such speeds as are ordinarily attained upon a high speed web printing press, to interpose suitable drying means, such as a steam heated cylinder which is commonly used in rotogravure work, between the intaglio cylinder and the main impression cylinder and in the path of the sheet being printed.

Our invention, which is applicable alike to the printing of paper or textile, renders it possible to produce on continuous web-presses even more faithful reproductions than is obtained by laborous offset lithographic processes when employing as many as six colors. Further advantages are the virtual elimination, owing to the register being positive throughout, of register difficulties such as are experienced in ordinary offset color printing wherein the sheet travels over numerous cylinders during the application of the color thereto and the reduction to a minimum of the possibilty of blurs occurring due to stretching of the large blankets employed in most offset color printing. Besides the latter advantage in respect to minimizing blurs, the small sections of blankets used are far easier and more economical to replace when soiled or worn than are the large blankets usually employed in such work.

Various changes may be made within the scope of the pending claims without departing from the spirit of our invention.

The various cylinders are of course journaled in bearings and connected in the well-known manner with power operated driving mechanism. Furthermore, the various distributing rolls shown are of the well-known construction at present in use in this art.

The web or sheet after passage beneath the intaglio cylinder from which it receives a direct print is, of course dried in the usual manner customary in the handling of rotogravure prints.

In practising our invention we much prefer to employ the ordinary planographic (i. e. surface printing) plates on the offset printing rolls 1, $1^a$ and $1^b$, as distinguished from the employment thereon of intaglio or relief printing plates, since while in the latter case the first print obtained from the intaglio or relief plates would be fairly good, there would inevitably be a gradual accumulation of surplus ink on the blanket due to the incomplete removal of same by the sheet being printed and as a consequence clean printing in this manner from such plates, as distinguished from the planographic plates commonly used in offset printing, would be difficult, if not impossible.

While offset printing has certain advantages in that the yielding blanket compensates for irregularities in the paper, as distinguished from direct printing wherein an unyielding metal plate is in contact with the paper, thus enabling one to reproduce delicate shades very faithfully, nevertheless, one of the objections to the offset printing is the fact that one cannot produce the key color varying from the intense depths up to the finest gradations of tones as is possible when a direct intaglio print in the key color is superimposed in the manner herein described. Accordingly, our process, while enabling one to utilize the advantages of the intaglio for the key color and thus obtain all gradations of color from the intense depths to the softest tones, at the same time preserves all the advantages of offset printing including that of the relatively cheap cost of same.

The term "blanket" as used in the claims is a term well understood in the art to indicate yielding impression-receiving means and commonly consists of a built-up rubber and fabric sheet, although obviously it may be made of any suitable material capable of offering the necessary yielding support or impact desirable in this art.

The term "sheet" as used in the claims includes, of course, either one of a series of separate sheets or a single continuous sheet such as a web.

The term "key color" as used in the claims is intended to denote the master or ground color in which the deepest shades as well as some of the most delicate tints appear in the finished print.

Having thus described our invention, what we claim and desire to secure by Letters Patent is:

1. In a press for making color prints, the combination comprising a main impression cylinder, blanket means supported thereby, a plurality of offset color-printing cylinders and a supplemental impression cylinder, adapted to yieldingly support a sheet to be printed, all geared to said main cylinder, the periphery of said latter cylinder being at least the equal of the combined peripheries of all the offset color-printing cylinders aforesaid, an intaglio printing cylinder in gear with such supplemental cylinder and adapted to have impression contact with such sheet when the same is supported on said supplemental impression cylinder and means for supplying ink to said offset printing cylinders.

2. In a press for making color prints, the combination comprising a main impression cylinder, blanket means supported thereby, a plurality of offset color-printing cylinders and a supplemental impression cylinder, adapted to yieldingly support a sheet to be printed, all geared to said main cylinder, the periphery of said latter cylinder being at least the equal of the combined peripheries of all the offset color-printing cylinders aforesaid, an intaglio printing cylinder in gear with such supplemental cylinder and adapted to have impression contact with such sheet when the same is suppored on said supplemental impression cylinder, means for supplying ink to said offset printing cylinders and means for optionally throwing said offset printing cylinders into and out of impression contact with said blanket means.

3. In a press for making color prints, the combination comprising a main impression cylinder, blanket means supported thereby, a plurality of printing cylinders all of the same periphery, adapted to successively superimpose registering impressions directly upon said blanket means, a supplemental impression cylinder, also of the same diameter as each printing cylinder, adapted to serve as a support for a sheet of material to be printed, means for optionally throwing said printing cylinders and said supplemental cylinder into and out of impression contact with said main cylinder, and the periphery of the latter cylinder being at least the equal of the combined peripheries of all the printing cylinders aforesaid, an intaglio printing cylinder in gear with said supplemental impression cylinder and of substantially equal diameter therewith and means for supplying ink to said printing cylinders and said intaglio cylinder.

4. In a press for making color prints, the combination comprising a main impression cylinder, blanket means supported thereby, a plurality of offset color-printing cylinders and a supplemental impression cylinder all geared to said main cylinder, the periphery of said latter cylinder being at least the equal of the combined peripheries of all the offset-color printing cylinders aforesaid, an intaglio printing cylinder geared to said supplemental impression cylinder and means for optionally throwing said offset printing cylinders into and out of impression contact with said blanket means.

5. In a press for making color prints, the combination comprising a main impression cylinder, blanket means supported thereby, a plurality of printing cylinders adapted to successively superimpose registering impressions directly upon said blanket, a supplemental impression cylinder adapted to serve as a support for a sheet of material to be printed, means for optionally throwing said printing cylinders and said supplemental cylinder into and out of impression contact with said main cylinder, and the periphery of the latter cylinder being at least the equal of the combined peripheries of all the printing cylinders aforesaid, an intaglio printing cylinder in gear with said supplemental impression cylinder and means for supplying ink to said printing cylinders and said intaglio cylinder.

6. In a press for making color prints, the combination comprising printing means for producing an incomplete multi-color offset composite impression upon a sheet of material to be printed and roto-gravure means for imprinting directly upon said sheet an impression from an intaglio cylinder in register with such incomplete composite impression.

7. In a press for making color prints, the sub-combination comprising a main impression cylinder, blanket means supported thereby, a plurality of printing cylinders equipped with printing plates on the peripheries thereof and a supplemental impression cylinder, adapted to yieldingly support a sheet to be printed, all geared to said main impression cylinder, an intaglio printing cylinder in gear with the latter cylinder, and means for optionally throwing said printing cylinders into and out of impression contact with the blanket means on said main impression cylinder.

8. The continuous method of making color prints, which consists in successively taking off upon a blanket registering impressions from a plurality of moving offset color-printing surfaces, then taking off a composite impression from said blanket onto a sheet of material to be printed and then taking off an impression in register with said composite impression on said sheet from an intaglio printing surface.

9. The continuous method of making color prints, which consists in successively taking off upon a blanket registering impressions in different colors respectively from a plurality of moving offset color-printing surfaces, each of said impressions representing only the portion of the original copy to be reproduced which is intended to be printed in the particular color of said impression, then taking off the composite impression so made from said blanket onto a sheet of material to be printed and then directly superimposing upon said composite impression a registering impression from an intaglio printing cylinder consisting of that portion of the original which was absent from such offset impression.

10. The continuous method of making color prints, which consists in successively taking off upon a blanket registering impressions in different colors respectively from a plurality of moving offset color-printing surfaces, each of said impressions representing only the portion of the original copy to be reproduced which is intended to be printed in the particular color of said impression, then taking off the composite impression so made from said blanket onto a sheet of material to be printed, then superimposing in register with said latter impression an impression from an intaglio printing cylinder which latter impression represents the portion of the original copy to be reproduced that is intended to appear as shades.

11. In the continuous method of making color prints, the steps which comprise the successive taking off upon a blanket of registering impressions in different colors respectively from a plurality of moving offset color-printing surfaces, transferring such multi-color composite impression from said blanket to a sheet of material to be printed, then directly superimposing upon said composite impression on such sheet a registering impression from an intaglio printing cylinder which latter impression corresponds to that portion of the original which was absent from said multi-color impression offset upon said sheet.

12. The method of making color prints, which consists in first offsetting upon a sheet of material to be printed, a plurality of registering impressions from separate offset printing rolls and then directly superimposing upon such composite impression an impression from an intaglio printing plate, said intaglio impression being in the key color of the original.

Signed at New York city, in the county and State of New York, this 20th day of December, 1921.

OSWALD R. SCHULTZ.
OTTO KIRSCH.